United States Patent
Apostolos et al.

(10) Patent No.: US 8,401,297 B1
(45) Date of Patent: Mar. 19, 2013

(54) NEUROMORPHIC PARALLEL PROCESSOR

(75) Inventors: John T. Apostolos, Lyndeborough, NH (US); Judy Feng, Nashua, NH (US); William Mouyos, Windham, NH (US); Benjamin McMahon, Keene, NH (US)

(73) Assignee: AMI Research & Development, LLC, Windham, NH (US)

( * ) Notice: Subject to any disclaimer, the term of this patent is extended or adjusted under 35 U.S.C. 154(b) by 0 days.

(21) Appl. No.: 13/536,494

(22) Filed: Jun. 28, 2012

Related U.S. Application Data

(60) Provisional application No. 61/502,248, filed on Jun. 28, 2011.

(51) Int. Cl.
  *G06K 9/00* (2006.01)
  *G06K 9/62* (2006.01)

(52) U.S. Cl. .................... 382/181; 382/224

(58) Field of Classification Search .......... 382/115, 382/159, 160, 165, 170, 181, 209, 217, 218, 382/224, 225, 226, 227, 228, 280, 199, 219, 382/220, 210, 278; 706/15, 19, 20, 22, 41; 700/47, 50
See application file for complete search history.

(56) References Cited

U.S. PATENT DOCUMENTS

| | | | |
|---|---|---|---|
| 4,247,939 A | 1/1981 | Stromswold et al. | |
| 4,305,159 A | 12/1981 | Stromswold et al. | |
| 4,336,511 A | 6/1982 | Stromswold et al. | |
| 4,633,257 A | 12/1986 | Apostolos | |
| 4,641,143 A | 2/1987 | Apostolos | |
| 4,646,099 A | 2/1987 | Apostolos | |
| 4,649,392 A | 3/1987 | Apostolos | |
| 4,654,667 A | 3/1987 | Apostolos et al. | |
| 4,656,642 A | 4/1987 | Apostolos et al. | |
| 4,808,950 A | 2/1989 | Apostolos et al. | |
| 4,870,420 A | 9/1989 | Apostolos | |
| 5,029,235 A | 7/1991 | Apostolos et al. | |
| 5,079,735 A | 1/1992 | Apostolos | |
| 5,343,207 A | 8/1994 | Stromswold et al. | |
| 5,859,930 A | 1/1999 | Chase | |
| 6,121,856 A | 9/2000 | Apostolos | |
| 6,366,627 B1 | 4/2002 | Apostolos et al. | |
| 6,677,883 B2 | 1/2004 | Apostolos | |
| 7,123,181 B2 | 10/2006 | Apostolos | |
| 7,642,963 B2 | 1/2010 | Apostolos et al. | |
| 2005/0089243 A1* | 4/2005 | Ludwig | 382/280 |
| 2007/0230820 A1* | 10/2007 | Ludwig | 382/280 |

* cited by examiner

*Primary Examiner* — Brian Le
(74) *Attorney, Agent, or Firm* — Cesari and McKenna, LLP

(57) ABSTRACT

A neuromorphic parallel image processing approach that has five (5) functional layers. The first performs a frequency domain transform on the image data generating multiple scales and feature based representations which are independent of orientation. The second layer is populated with feature based representations. The third layer, an object class recognizer layer, are fused using a neuromorphic parallel processor. Fusion of multimodal data can achieve high confidence, biometric recognition.

9 Claims, 9 Drawing Sheets

NEUROMORPHIC PARALLEL PROCESSOR

RELATED APPLICATION

This application claims the benefit of U.S. Provisional Application No. 61/502,248, filed on Jun. 28, 2011.

The entire teachings of the above application is incorporated herein by reference.

BACKGROUND OF THE INVENTION

Computer vision systems have been implemented in the past few years for applications such as face, finger print, iris, target recognition and general object recognition. These applications involve limited domains of interest such as face recognition under controlled conditions at airports. "Face in a crowd" applications in wide spaces or corridors have not been accurate enough to replace human operators in multiple camera surveillance systems. Humans and primates still outperform the best computer vision systems by almost any measure. False alarm rates and false rejection rates are usually too high to make the systems viable.

How the brain recognizes objects is now being studied world wide in earnest. A system that emulates human object recognition seems to be a "Holy Grail". Indeed, Dharmendra Modha, Director of Cognitive Computing at IBM, stated "We have no computers today that can begin to approach the awesome power of the human brain. A computer comparable to the human brain, he added, would need to be able to perform more than 38 thousand trillion operations per second." See Mhoda, Dharmendra, IEEE 125th Anniversary Celebration Speech, New Yorker Hotel, Oct. 3, 2009.

In parallel with these efforts, the field of neuromorphic computing has emerged from a concept developed by Carver Mead in the late 1980's. The term neuromorphic has to do with the combining of analog and digital techniques in such a way as to emulate the brain's circuitry and architecture.

Other Information

Chirp Fourier Transform.

A chirp Fourier transform (CFT) is in reality a Fourier transform. The chirp Fourier transform lends itself more readily to an analog implementation than a straight Fourier transform. The methodology of the chirp Fourier transform is as follows: 1) Multiply the input spectrum by a chirped waveform, 2) Convolve the chirped input spectrum with the impulse response function of the matched dispersive delay line, and 3) Multiply the convolved result by the inverse of the input chirp multiplier. In an analog version steps 1 and 3 are accomplished with mixers and step 2 is accomplished by utilizing a physical dispersive delay line (DDL). A compressive receiver is a special case of the CFT in that the bands of interest are wider than the bandwidth of the DDL. The down side of this condition is that there are gaps in the signals of interest such that only narrowband signals can be reconstructed completely. More information about these approaches is in two issued U.S. Pat. Nos. 4,649,392 entitled "Two dimensional transform utilizing ultrasonic dispersive delay line" and 4,646,099 entitled "Three dimensional Fourier transform device".

Fast Pattern Recognizer.

It is also known that a fast pattern recognizer (FPR) can be based on reduced dimensionality frequency domain convolution techniques which is a general pattern recognizer capable of operating on any 2-D pattern with non-zero gradient information. It performs well on degraded (e.g. blurred, smudged, or partially obscured) inputs, allowing reasonable operation using imperfect enrollment or sensor data. The operation requiring the most processing power is the matched filter/correlation stage. Such FPR algorithms have been implemented completely in software on for example a standard laptop, and also on a desk top computer with the correlator being digitally emulated by an FPGA. An analog/digital mixed-mode PCI based expansion board for use in desktops used a surface acoustic wave (SAW) dispersive delay line (DDL) to implement a Chirp Fourier Transform (CFT) convolver. This technology is further described in detail in U.S. Pat. No. 5,859,930. FPR has been used for speech recognition and speaker identification in the presence of noise or other speakers and in law enforcement where police composites were processed by the FPR to find the perpetrators in police mug shot data bases.

SUMMARY

A neuromorphic parallel image processor technology with functionality similar to that of the biological neuron forms the basis of a robust vision system. This fast neural emulator becomes a building block to provide rapid, mixed-mode analog/digital pattern recognition.

The neuromorphic parallel processor system can have five (5) functional layers. The first of these layers is an image processor which is associated with processing in the primary visual cortex. It performs a frequency domain transform on the image domain data and generates multiple scales and orientation based feature representations which are independent of position.

The second layer is populated with feature based representations of objects such as faces (both visual and infrared) fingerprints, palm prints, vehicles, aircraft, ships, buildings, and various sounds and speech sonograms and is not unlike a universal dictionary of features.

The third layer is an object class recognizer layer, The feature based representations of objects in the second layer of the neuromorphic parallel processor are fused in this layer to obtain better performance when recognition of individual objects is the objective. Fusion of multimodal biometric data from this layer can achieve high confidence biometric recognition.

The fourth and fifth layers are concerned with inferring the presence of situations of interest in order to alarm the interested parties.

The design implementation of this five (5) layered neuromorphic parallel processor solution addresses the need for a low-power processor that can facilitate massive computational resources necessary for tasks such as scene understanding and comprehension. It is similar to that of a biological neuron with its mixed-mode analog/digital fast neural emulator processor capability where some key features are: 1. Low Size, Weight and Power (SWaP), 2. Low Loss, and 3. Low Installation Complexity and Cost.

In one implementation, an extremely fast mixed mode analog/digital processor is capable of performing, for, example, to an equivalent of 80 trillion operations per second. Perception of complex visual scenes and complex scene understanding rely on robust pattern recognition algorithms which are scale, rotation, translation, and orientation independent. The algorithm(s) are insensitive to illumination variability, partial occlusion, and cluttered environments. The processing power required to quickly recognize objects as effectively as human beings is debatably greater than that available in any existing supercomputers. Furthermore, if such processing power were to be of utility to support soldier wearable applications such as image processing, the power requirements would have to be orders of magnitude less than those in existing supercomputers.

The implementation can be in any convenient mixed-signal circuitry, depending on the available technology. For example, an analog/digital mixed mode expansion board can be placed in a Personal Computer (PC). The expansion board includes a surface acoustic wave dispersive delay line to implement a chirp Fourier transform based synaptic weights/sensory data convolver. The surface acoustic wave (SAW) dispersive delay line can be a titanium dioxide based dispersive delay line with a wide bandwidth.

One specific approach utilizes four (4) specialized processors in parallel to power five (5) layers in a convolutional hierarchical network which emulates the biology of the brain. These mixed-mode analog/digital processors serve as fast neural emulators which convolve the synaptic weights with sensory data from the image processor layer, to provide macro level neuron functionality. The fast neural emulator creates virtual neurons that enable unlimited connectivity and reprogrammability from one layer to another. Our network topologies and the synaptic weights are stored in memory and output spikes are routed between layers. The fast neural emulator creates virtual neurons that enable unlimited connectivity and reprogrammability from one layer to another. The network topologies and the synaptic weights are stored in memory and output spikes are routed between layers.

In certain arrangements, for example where four (4) neural emulators are implemented with currently available integrated circuit technologies, the system can provide an equivalent $8 \times 10^{13}$ operations/sec within a 10.0 cubic cm form factor. This would yield more than 1,000 times the power efficiency available in other approaches.

In one implementation, the pattern recognizer is estimated to have the capability of convolving a 384×384×8 image with a 288×192×8 image in 800 nanoseconds. With four (4) of these processors arranged in parallel, the total processing power of the neuromorphic parallel processor can be estimated to be greater than that of 50 million neurons, with a power consumption of less than 5.0 watts or 0.25 pico Joules/operation.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF EXAMPLE EMBODIMENTS

A description of example embodiments follows.
System Architecture

Figure 1:
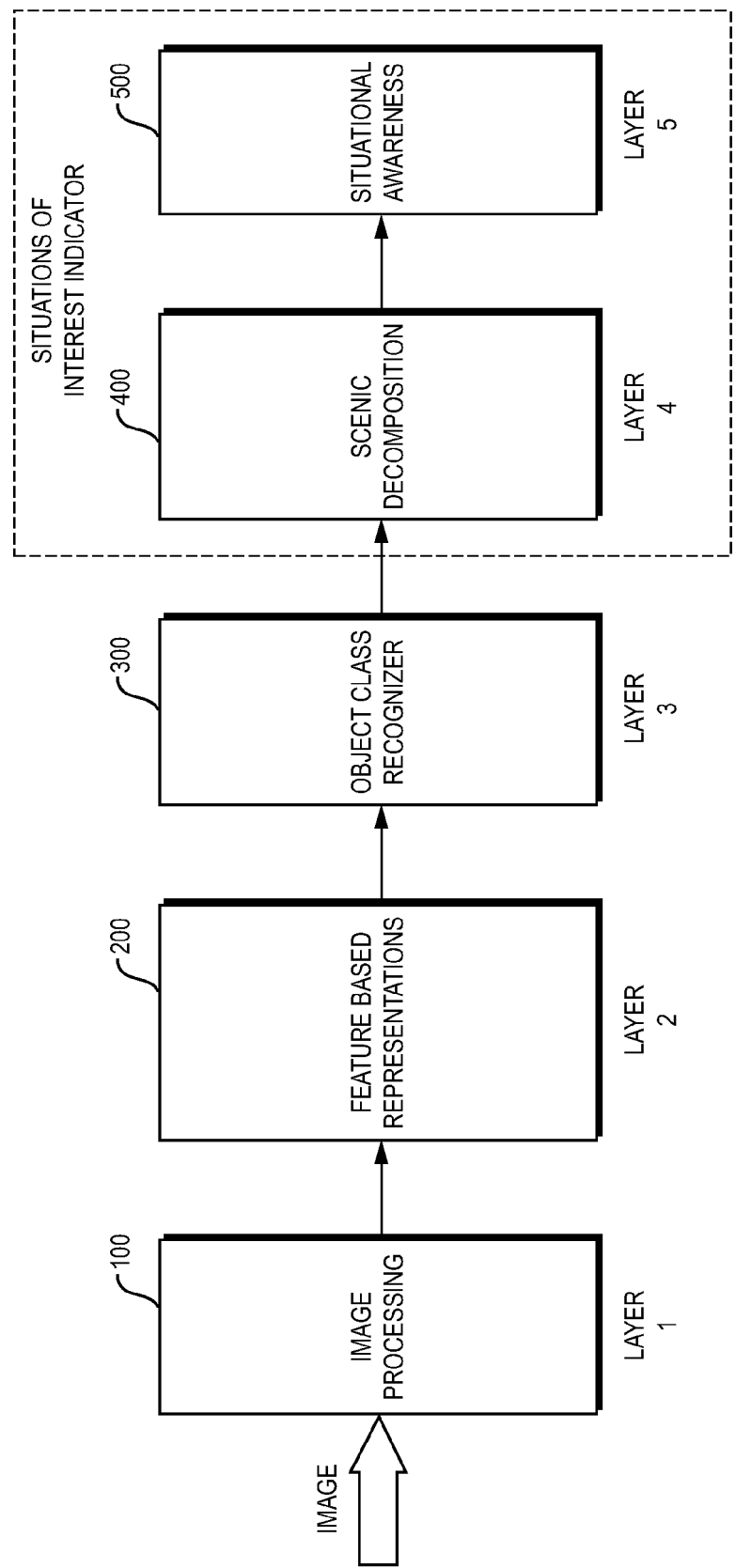
FIG. 1 is a high level functional block diagram of the neuromorphic parallel processing system.

The neuromorphic parallel processor system has five (5) functional layers as shown in FIG. 1.

The first of these layers 100 (layer 1) is an image processor which is associated with processing in the primary visual cortex.

The second layer 200 (layer 2) is populated with feature based representations of objects such as faces (both visual and infrared) fingerprints, palm prints, vehicles, aircraft, ships, buildings, and various sounds and speech sonograms and is not unlike a universal dictionary of features.

The third layer 300 (layer 3) is the object class recognizer layer.

Figure 2:
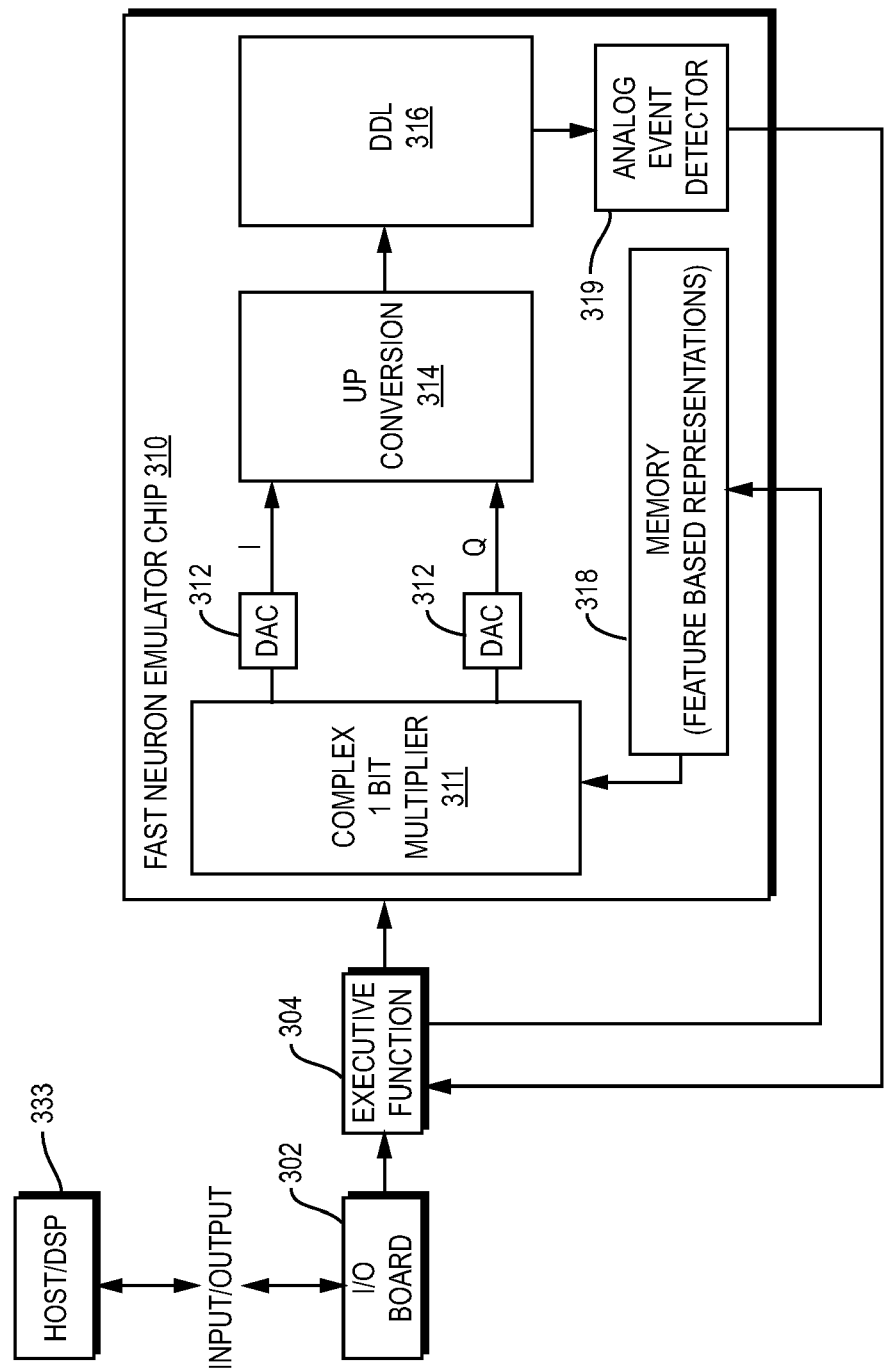
FIG. 2 illustrates a fast neuron emulator.

The fourth 400 (layer 4) and fifth 500 (layer 5) are concerned with inferring the presence of situations of interest in order to notify the interested parties.
Fast Neuron Emulator A primary building block of the neuromorphic parallel processor is the fast neuron emulator 310 shown in more detail in FIG. 2. It includes an Input/Output interface board 302, an executive function 304, and fast neuron emulator 310, which is preferably implemented as a semiconductor chip. The fast neuron emulator 310 further includes a complex 1-bit multiplier 311, a pair of Digital to Analog Converters (DACs) 312, up-conversion 314, a Dispersive Delay Line (DDL) 316, a memory 318 for storing feature-based representations, and an analog event detector 319. The I/O board permits a host data processor or digital signal processor 333 to send image data to, and receive results from, the fast neuron emulator.

Figure 3:
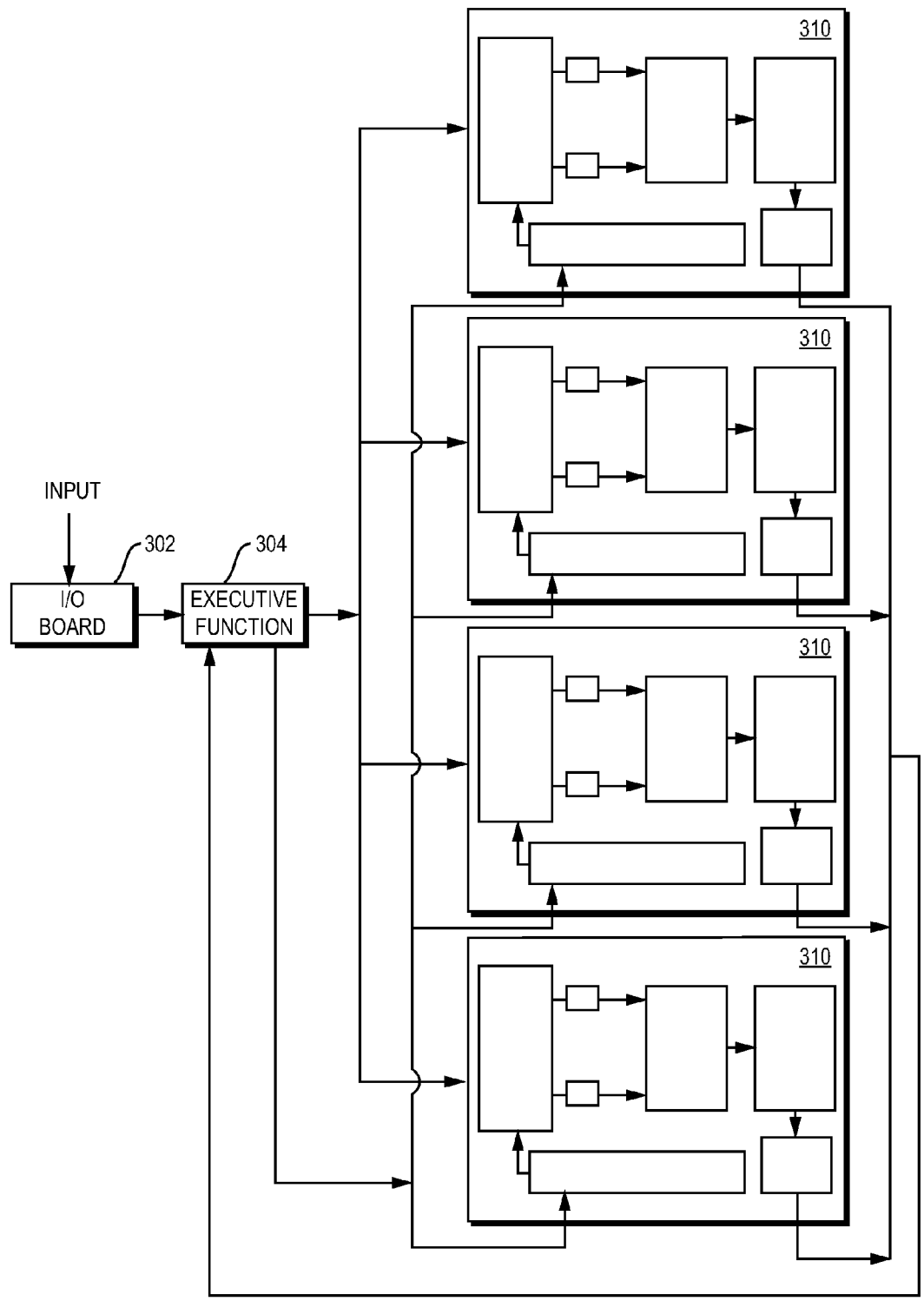
FIG. 3 is one implementation that uses four of the fast neuron emulators.
Figure 4:
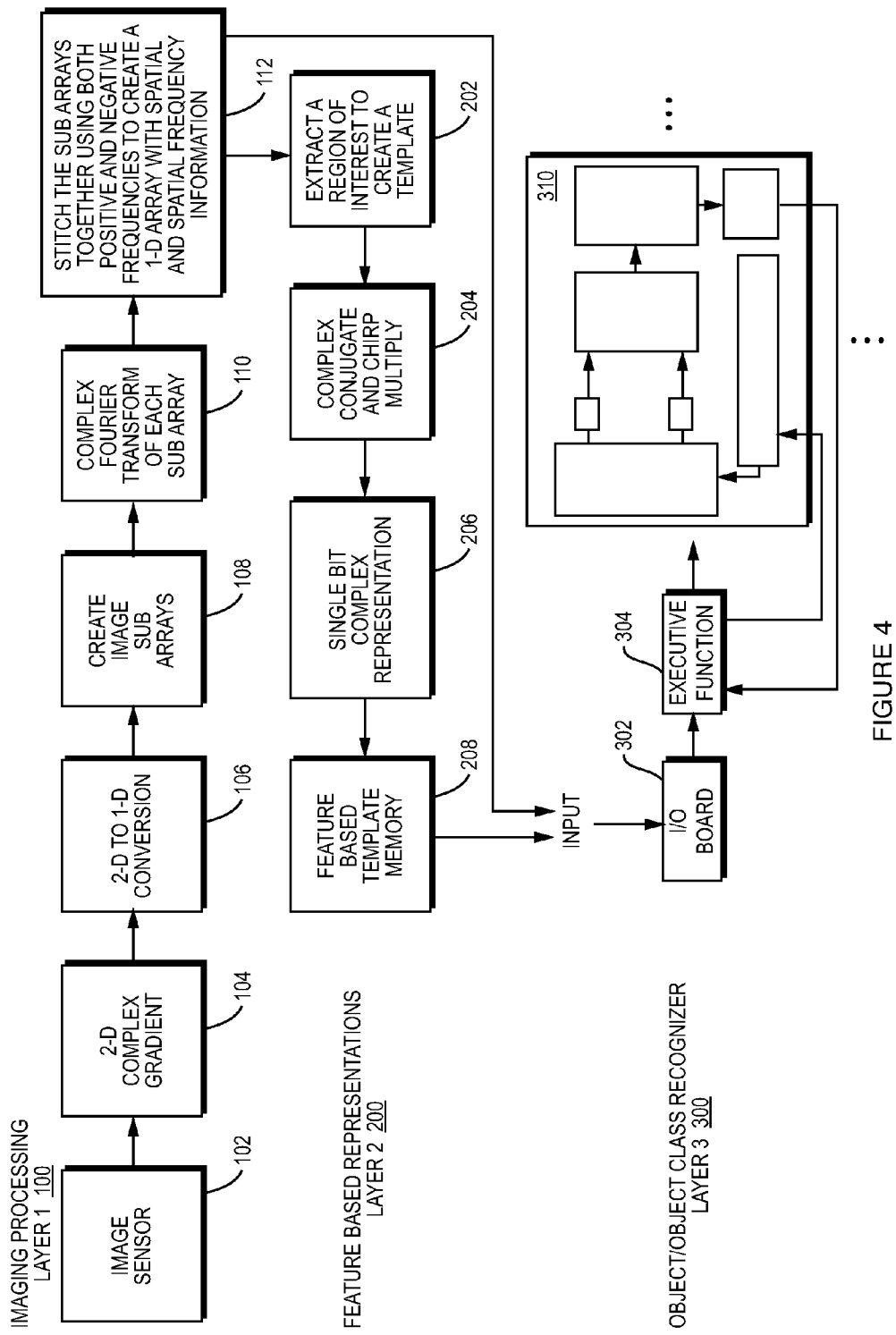
FIG. 4 shows process details for a first, second and third layer of the neuromorphic parallel processing system.

A convolution function is then implemented by the fast neuron emulator 310 by means of a Chirp Fourier Transform (CFT), where the matched chirp function is superimposed on the synaptic weights, which are convolved with the incoming data and fed into the Dispersive Delay Line (DDL) 316. If the synaptic weights are matched to the incoming data, then a compressed pulse is seen at the output of the Dispersive Delay Line 316 similar to the action potential in the neural axon.
Neuromorphic Parallel Processor The system architecture of one implementation of the neuromorphic processor is shown in FIG. 3. The executive function 304 controls four (4) fast neuron emulators 310 operating in parallel. The feature based representations are reduced dimensionally to single bit complex representations of the original data. For example, a 288×192×8 image is reduced to 256 bytes. An example peak throughput into the executive function block will be $50 \times 10^6$ events/sec.
Functional Layer Decomposition FIG. 4 is a more detailed view of the processes implemented in the first through third layers.

The image processing layer 1 (100) accepts data from the image sensor 102, computes a 2-D complex gradient 104, Gx+iGy, implements a 2-D to 1D conversion 106, creates image subarrays 108, performs a complex Fourier transform on the image subarrays 110, and stitches the subarrays together 112 using both negative and positive frequencies.

Figure 5:
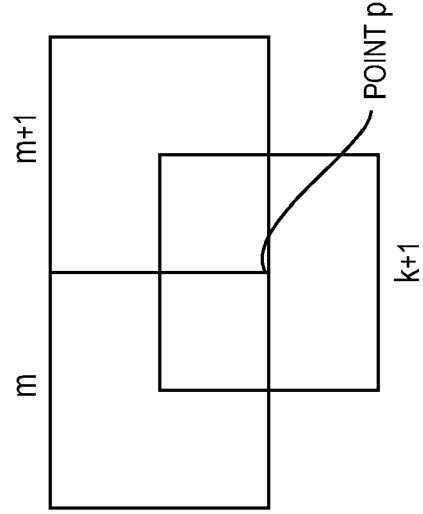
FIG. 5 illustrates a complex gradient determination.

The 2-D complex gradient 104 can be determined using the approach shown in FIG. 5. Two off set grids, grid k and grid m, are overlaid on the incoming image bit map 502. A group of three is used to generate the x and y components of the gradient at point p as:

$Gx = \text{sum}(m+1) - \text{sum}(k+1)$ $Gy = \text{sum}(m) - \text{sum}(k+1)$ where sum(m) is the sum of the grayscale pixel values inside m (for color images there are three bitmaps, RGB) and $G = Gx + iGy$ The choice of parameter "m" in the complex gradient calculation 104 in effect becomes a very efficient way to implement a zoom/scale operation. Setting the grid to include a larger number of pixels effectively zooms out of the image, and setting the grid to a smaller number of pixels effectively zooms in.

Figure 8:
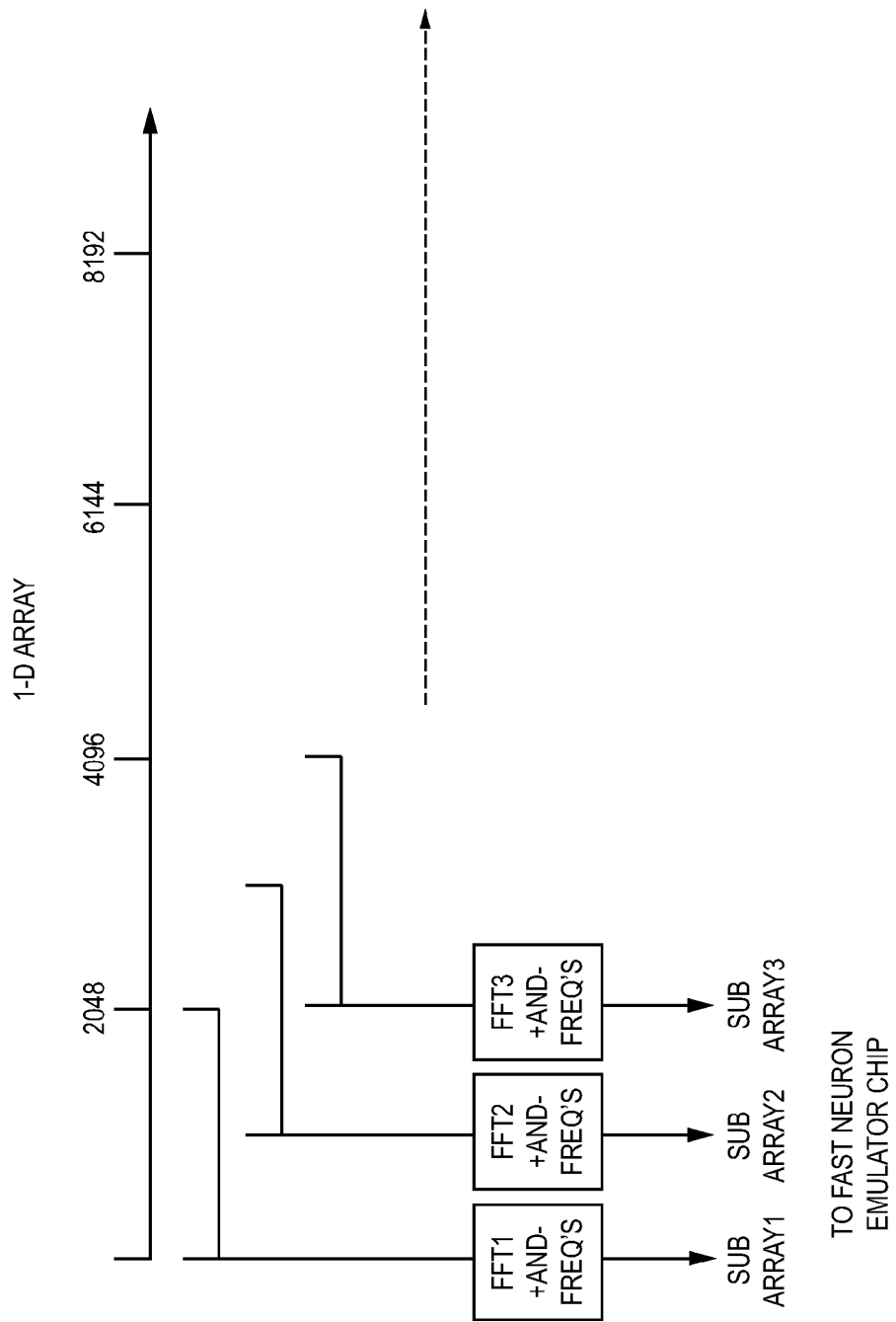
FIG. 8 illustrates a subarray stitching process.

The process of creating the image subarrays 108 and then stitching these back together 112 can be better understood from FIG. 8. Here the incoming result of 1-D conversion 106 signal is separated into sample groups that overlap in time, to create subarrays. Each subarray is then separately subjected to the complex-valued signal processing 110 that follows in layer 1, and the result is then stitched back together 112 at the end.

The feature based representations layer 2 (200) then extracts 202 a region of interest from an object image which has been selected as a template. The sequential operations of complex conjugate chirp 204 and single bit representation 206 are performed before entering the new template into the feature based template memory 208.

The object/object class recognizer layer 3 (300) then convolves the incoming image data with the templates in a template memory using the fast neuron emulator(s) 310. Correlation peak scatter plots are generated for each template in the analog event detector as described further below.

Figure 6:
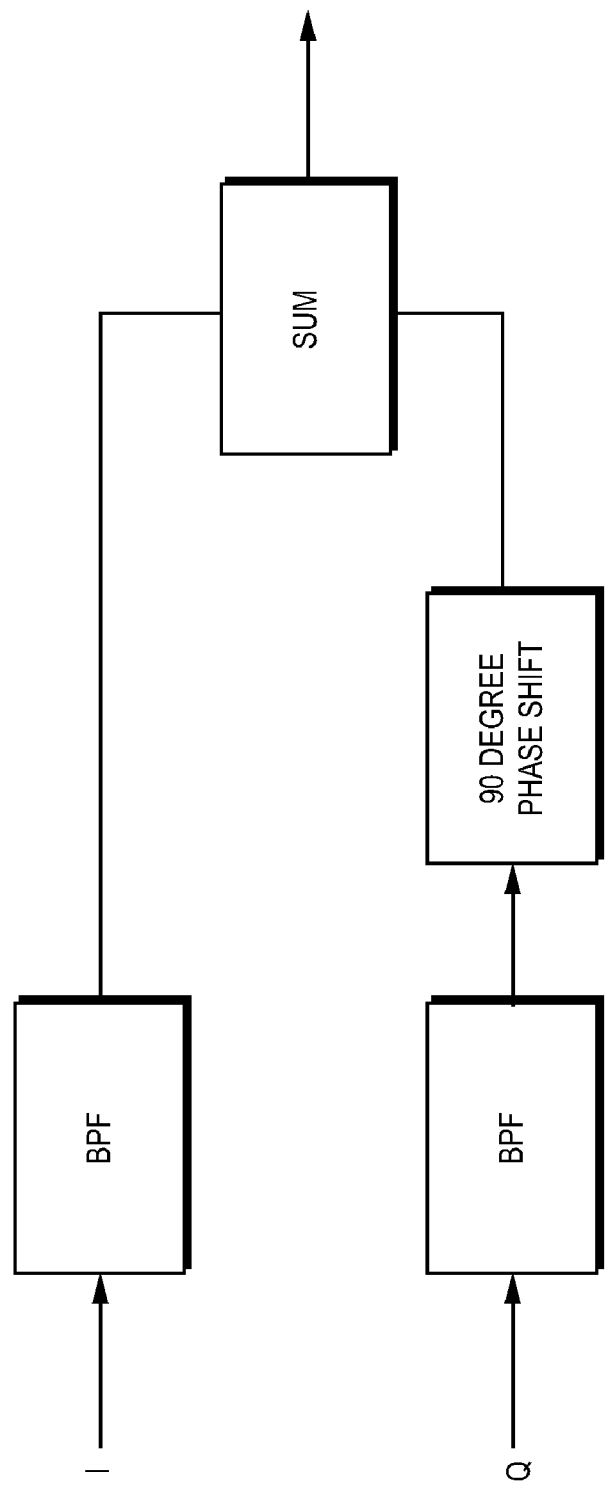
FIG. 6 illustrates detail for an upconverter.

FIG. 6 shows the layer 3 up converter 314 in more detail. One of the I and Q channels' aliased output bands is filtered and combined to feed a dispersive delay line. The dispersive delay line center frequency is chosen to equal the center of the aliased output band of interest.

Fusion Algorithm

The processing of feature based representations of objects in the second layer of the system may be fused to obtain better performance when recognition of individual objects is the objective. In the case where the application is to recognize and verify the identity of a person, fusion of multimodal biometric data can achieve high confidence biometric recognition. The preferred biometric based approach here can be divided into three (3) stages—

1. Feature extraction, in which the biometric signature is determined;
2. Matching, in which the degree of match between an unknown signature and an enrolled signature is determined; and
3. Decision, in which the determination of whether or not a match is made.

The approach preferred here is based on a suitable digital signal processor 333 performing fusion at the matching stage (layer 3). In this approach, separate feature extraction is performed on each biometric input and a score is independently developed regarding the confidence level that the extracted signature for each modality matches a particular enrolled biometric record. Then, a statistical combination of separate modal scores is done based on the scores and the known degree of correlation between the biometric modalities.

The scores are weighted by the image quality in both the enrollment and the captured image to give preference to higher quality capture data. If the modes are completely independent (such as face and fingerprint) the correlation is near zero and the mode scores are orthogonal resulting in maximum information in the combined score. If there is a correlation between the modes (such as between faces viewed in visible and near IR), the scores are not completely orthogonal, but neither are they coincident, allowing additional confidence information to be profitably extracted from the orthogonal component.

Figure 7:
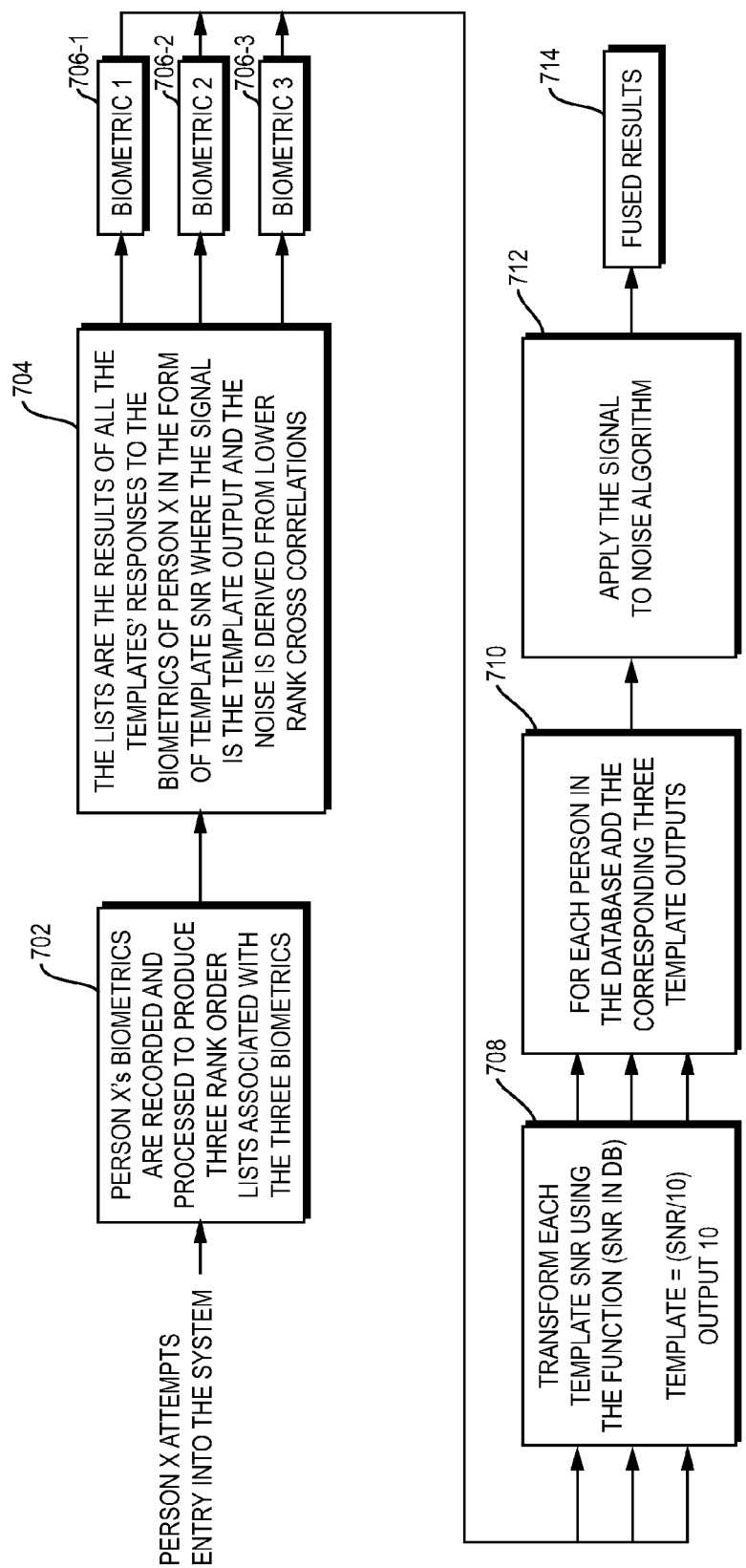
FIG. 7 is a flow diagram of a tri-model fusion process.

FIG. 7 is a flow diagram of one implementation of a fusion algorithm executed by DSP 333. In a first state 702, a person x requesting access has a number, such as three (3), of biometrics recorded and processed. This produces three rank ordered lists, one associated with each biometric. In state 704 this list then becomes the result of all template responses to the biometrics of person x. This is represented in the form of a template SNR, where the signal is the template output and the noise is derived from the cross-correlation with other templates. The result is therefore three biometric scores 706-1, 706-2, 706-3.

In a next state each template SNR is transformed into a power function of the form:

$$10^{SNR/10}$$

For each template in the database, the corresponding three template outputs are then added in state 710. The signal to noise ratio algorithm is then reapplied in state 712, and the results are fused at 714. The fusion result is obtained by adding these outputs together, or by combining them in other ways such as by weighting one biometric higher than another.

Verification Algorithm

For purposes of explanation assume there are several different biometrics. There is a template in each of the biometric databases associated with each person enrolled in a population of potential subject persons. The final output of each biometric screening of person x is a rank ordered list of template SNR's, where each template SNR is a signal to noise ratio associated with the response of that template to the biometric screening of person x. For the case of recognition of a person "x" from a population whose biometrics have been recorded and processed in a screening process, the template SNR's represent the response of the templates of all the people registered in the data base. If all goes well then person x will be ranked #1.

For the case of verification, where person x declares his Personal Identification Number (PIN) or provides other personal identification data (such as a credit card, drivers license number, etc.) and his biometric screening will further confirm who he actually is, the templates used are those of a generic list of people representing a cross section of the population. For example, the generic list of templates might include a template of a facial photo for a representative persons of difference races, skin color, national origin, ethnicity, sex, or myriad other classifications.

The computer adds person x's template to the generic template database after he enters his PIN. Again, if all goes well, person x will be ranked #1 —in other words, the convolution of his capture template against his own template should score higher than any of the generic templates. The number of people in the generic list will determine the accuracy of the result. The more people for which generic templates exist and are checked against, the higher the accuracy will be. This procedure is superior to any sort of pixel to pixel matching process between person x's template and his screening result. It is also more efficient than checking person x against a large number of other personal templates, which may number in the many thousands or millions in some applications.

Signal to Noise Algorithm

The signal to noise ratio is calculated by 1) squaring all the template voltages in the rank order list to obtain a template power rank order list, 2) calculate the 2 sigma point on the power rank order list, 3) calculate the average of the sum of all the template powers greater than the 2 sigma point, 4) divide each template power in the rank order list by the average from 3) to obtain the template SNR rank order list.

Fusion Algorithm

The biometrics are fused by applying this procedure: 1) for each biometric, convert the template SNR rank order list to a new power rank order list by raising 10 to the SNR/10 power for each template, 2) create a fusion template power rank order list by adding the new powers from all the biometrics for each respective template (person) 3) calculate the fusion template SNR rank order list using the above signal to noise algorithm.

Scale/Zoom Algorithm

By using a scale zoom function, no scaled versions of any representation need be stored in layer 2. The template database is correlated against each zoom state. This will save memory space and increase computational speed.

Angular Shift

By using a sliding angular shift function in the plane of the image, no angular shifted versions of any representation need to be stored in layer 2. The template data base is correlated against each angular shift state. This will save memory space and increase computational speed.

Template SNR Scatter Plot Centroid and Peak

In general, for scale and orientation independence in object recognition, there must be a sweep over all expected scales and orientations using a combination of scale zoom, angular shift and oriented templates. This sweep will generate a scatter plot of correlation peaks for each different object in the data base. The final correlation peak location is determined by calculating the centroid of the correlation peaks, and the final peak value is determined by adding all contributions from the peaks.

Results

Figure 9:
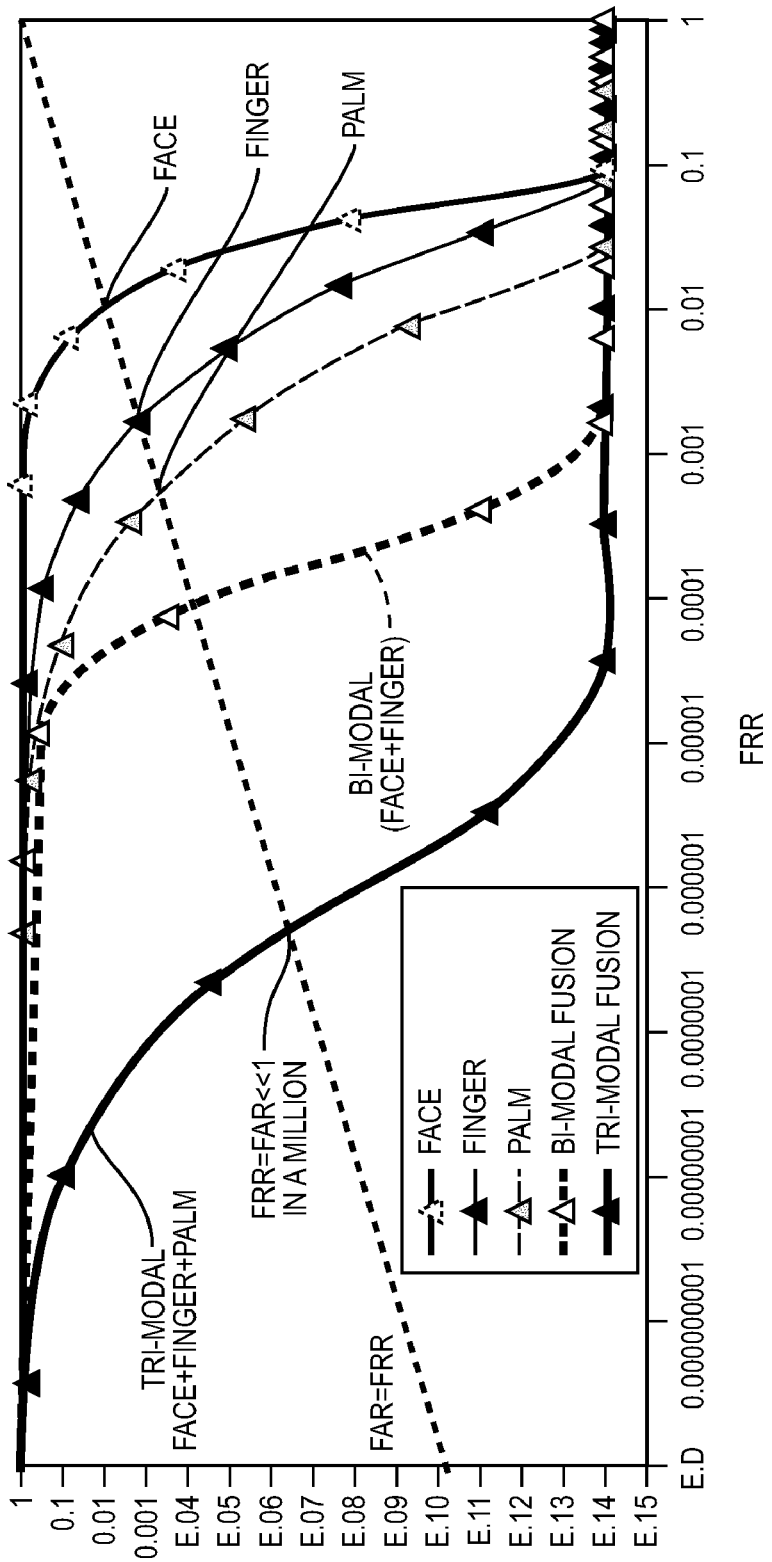
FIG. 9 shows the results of tri-modal fusion.

FIG. 9 shows the results of tri-modal fusion using face, fingerprints, and palm where multimodal fusion dramatically improves accuracy. The cross-over points on the Receiver Operating Curves (ROC) show a remarkable improvement from single mode to tri-modal of 1/100 to 1/1,000,000 probability of false acceptance or false rejection.

Implementation Details

Those of skill in the art will now appreciate that the various illustrative components, logical blocks, signal processing blocks, modules, circuits, and algorithm steps described in connection with the embodiments disclosed above may be implemented as analog or digital electronic hardware, or as computer software, or as combinations of the same. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative components, logical blocks, modules, and circuits described in connection with the embodiments disclosed herein may be implemented or performed with general purpose processors, digital signal processors (DSPs) or other logic devices, application specific integrated circuits (ASICs), field programmable gate arrays (FPGAs), discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of the methods or algorithms described in connection with the embodiments disclosed herein may be embodied directly in hardware, in software or firmware modules executed by a processor, or in a combination thereof. A software product may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

Benefits

The neuromorphic processor is a disruptive technology that could change the face of the industry. Application is seen for all database manipulation and searches, image processing for radar application, scene understanding for robotics, medical imaging processing, and the list goes on. As society becomes more and more dependent on computers for their needs and speeds increase there is a need for a fundamental change in how they are architected. With our approach speeds could increase by an order of magnitude while Size, Weight and Power (SWaP) would decrease.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. An apparatus comprising a pattern recognizer further comprising:
    a first functional layer providing an image processor;
    a second functional layer extracting a feature based representation of one or more objects of interest;
    a third functional layer providing object class recognition;
    wherein image representations are maintained as complex-data values, the first functional layer comprises a complex gradient determination, the second functional layer comprises a complex conjugate chirp fourier transform, and the third functional layer is implemented using a complex valued neuron emulator based on a mixed mode signal processor comprising a complex multiplier, up converter, and dispersive delay line; and
    wherein the third functional layer further provides scale and orientation independence by sweeping over expected scales and orientations using a combination of scale zoom, angular shift and oriented templates, to generate a scatter plot of correlation peaks for each different object in the data base, and to determine a final correlation peak location by calculating a centroid of the correlation peaks, with the final peak value determined by adding all contributions from the correlation peaks.

2. The apparatus of claim 1 wherein the third functional layer further fuses results of matching three or more biometric parameters.

3. The apparatus of claim 2 wherein object class recognition further comprises:
    storing a set of templates for each of the biometric parameters for each of the members of a population;
    obtaining biometric parameters from a subject;

convolving the subject biometric parameters with each of the set of templates to determine a signal to noise ratio (SNR) associated with the response of each template to the respective biometric; and ranking the results of convolving to produce a rank order list.

4. The apparatus of claim 3 wherein a verification function comprises:

obtaining personal identification information from a subject person; and providing the templates as representative cross sections of the population.

5. The apparatus of claim 3 wherein SNR is further determined by squaring all the template voltages in the rank order list to obtain a template power rank order list, calculating a 2 sigma point on the power rank order list, calculating an average of the sum of all the template powers greater than the 2 sigma point, dividing each template power in the rank order list by the average from to obtain the template SNR rank order list.

6. The apparatus of claim 5 wherein SNR is further determined by:

for each biometric, converting the template SNR rank order list to a new power rank order list by raising 10 to the SNR/10 power for each template, determining a fusion template power rank order list by adding the new powers from all the biometrics for each respective template; and determining a fusion template SNR rank order list using the above SNR algorithm.

7. The apparatus of claim 1 wherein a scale/zoom operation is performed on image data such that scaled versions of a template representation need be stored in the second functional layer, and where the templates are correlated against one or more possible zoom states.

8. The apparatus of claim 1 wherein the third functional layer further:

applies a sliding angular shift function in the plane of the image, such that no angular shifted versions of any representation need to be stored in the second layer, and such that the templates are correlated against each angular shift state.

9. An apparatus comprising a pattern recognizer further comprising:

a first functional layer providing an image processor;

a second functional layer extracting a feature based representation of one or more objects of interest;

a third functional layer providing object class recognition;

wherein:

image representations are maintained as complex-data values, the first functional layer comprises a complex gradient determination, the second functional layer comprises a complex conjugate chirp fourier transform, and the third functional layer is implemented using a complex valued neuron emulator based on a mixed mode signal processor comprising a complex multiplier, up converter, and dispersive delay line wherein object class recognition further comprises storing a set of templates for each of the biometric parameters for each of the members of a population;

obtaining biometric parameters from a subject;

convolving the subject biometric parameters with each of the set of templates to determine a signal to noise ratio (SNR) associated with the response of each template to the respective biometric; and ranking the results of convolving to produce a rank order list; and wherein a verification function comprises:

obtaining personal identification information from a subject person; and providing the templates as representative cross sections of the population; and wherein SNR is further determined by squaring all the template voltages in the rank order list to obtain a template power rank order list, calculating a 2 sigma point on the power rank order list, calculating an average of the sum of all the template powers greater than the 2 sigma point, dividing each template power in the rank order list by the average from to obtain the template SNR rank order list; and wherein, for each biometric SNR is further determined by:

converting the template SNR rank order list to a new power rank order list by raising 10 to the SNR/10 power for each template, determining a fusion template power rank order list by adding the new powers from all the biometrics for each respective template; and determining a fusion template SNR rank order list using the above SNR algorithm.

\* \* \* \* \*